United States Patent [19]

Damico

[11] Patent Number: 4,579,486

[45] Date of Patent: Apr. 1, 1986

[54] HOLE SAW GUIDE

[76] Inventor: George Damico, 1 Stephens Ct., Crockett, Calif. 94525

[21] Appl. No.: 648,404

[22] Filed: Sep. 5, 1984

[51] Int. Cl.⁴ ............................................. B23B 49/00
[52] U.S. Cl. ....................................... 408/204; 408/75; 408/79; 408/82; 408/115 R
[58] Field of Search ....................... 408/204, 75, 79, 82, 408/115

[56] References Cited

U.S. PATENT DOCUMENTS

| | | | |
|---|---|---|---|
| 2,435,256 | 2/1948 | Whitmore | 408/115 |
| 2,633,040 | 3/1953 | Schlage | 408/79 |
| 3,011,369 | 12/1961 | Russell . | |
| 3,071,991 | 1/1963 | Vernooy . | |
| 3,257,896 | 6/1966 | Mills | 408/115 |
| 3,630,632 | 12/1971 | Holleman | 408/82 |
| 4,422,811 | 12/1983 | Ellison | 408/75 |

FOREIGN PATENT DOCUMENTS 900841 7/1962 United Kingdom .

Primary Examiner—Donald R. Schran
Attorney, Agent, or Firm—Townsend & Townsend

[57] ABSTRACT

A hole saw guide positions a hole saw while forming a new hole either partially overlapping or surrounding an existing hole in a work piece. The hole saw guide includes a disc-shaped body having a pilot drill guide hole through the center sized to guide the pilot drill of a conventional hole saw. Two or more guide arms extend radially outwardly from the body and have outer ends which engage the inner circumference of an existing hole in the work piece to secure the guide at a desired position. The guide arms are adjustable in length radially so the pilot drill guide hole in the body can be positioned where desired. The pilot drill of a conventional hole saw is then inserted into the pilot drill guide hole which properly centers the hole saw so that the new hole formed in the work piece is properly located.

7 Claims, 3 Drawing Figures

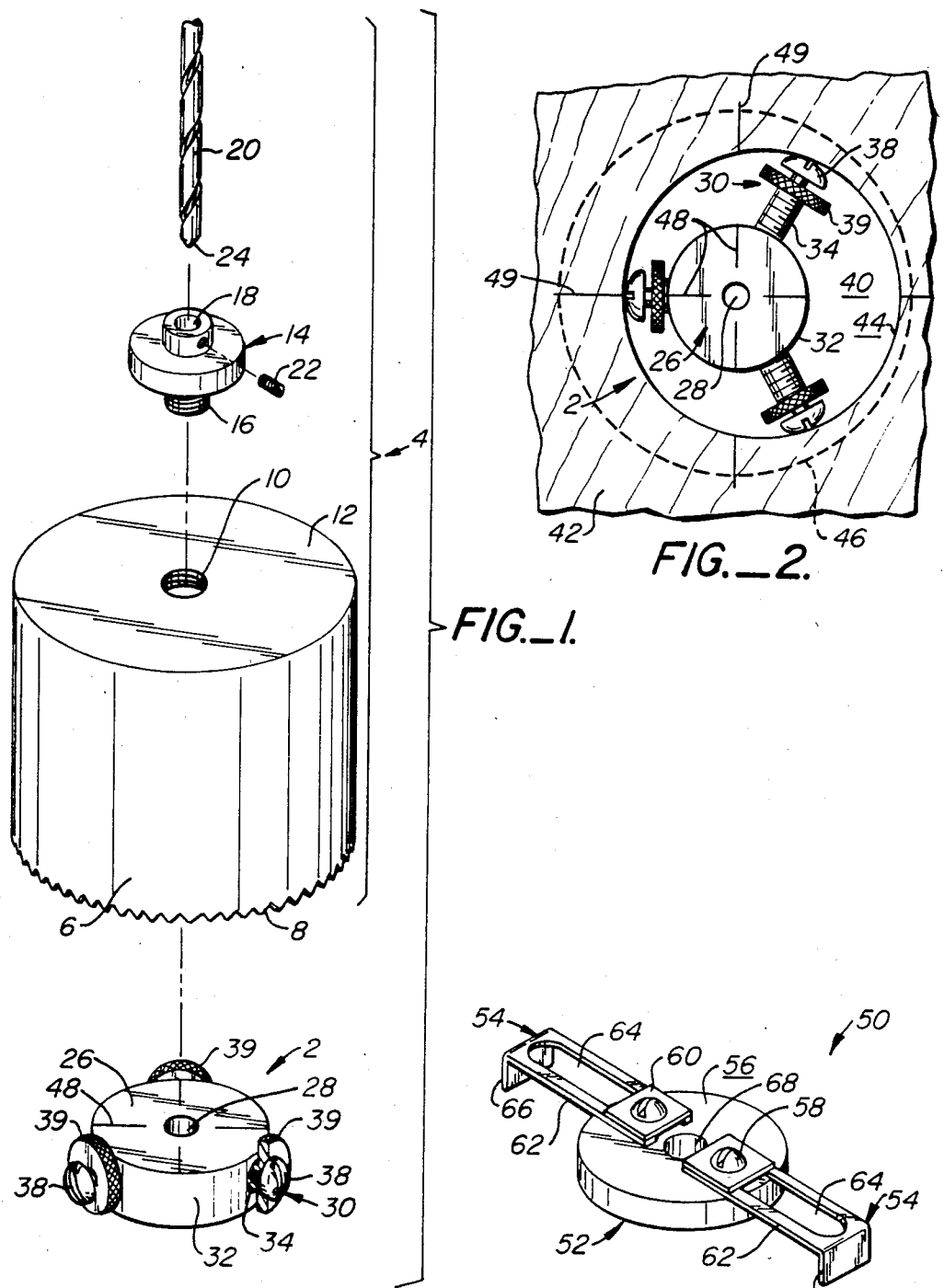

HOLE SAW GUIDE

BACKGROUND OF THE INVENTION

To cut relatively large diameter holes in a work piece, made of wood, metal or other material, a hole saw is often used. A hole saw is a cylindrical saw having teeth along its lower circular cutting edge and a top. The hole saw is mounted to a coaxially positioned pilot drill by a mandrel fastened within a hole formed in the top of the hole saw. The hole saw, mandrel and pilot drill are, in this application, collectively termed a hole saw assembly. Several different sizes of hole saws can be used with a single pilot drill and mandrel.

The pilot drill extends past the cutting edge of the hole saw so that a pilot hole is drilled into the material first before the hole saw begins to remove a circular plug of material from the work piece. The pilot drill thus keeps the hole saw properly positioned while the hole saw starts its cut. This need for positioning by the pilot drill is necessary when the hole saw is used with hand-held drills. Otherwise, especially when cutting a hard material such as metal, the hole saw would have a tendency to walk around the work piece when starting to cut the hole.

Once a hole is already cut into the work piece, if the hole is improperly positioned or is too small, or both, difficulties arise. That is, if a new hole is to be cut in the work piece, there is no longer any material for the pilot drill to cut into to guide the hole saw. In these situations it has generally not been possible to use a hand-held drill mounted hole saw to create the additional hole.

SUMMARY OF THE INVENTION

The present invention solves the problem of cutting a new hole in a work piece which partially overlaps or surrounds an existing hole in the work piece with a simply constructed, easy to use hole saw guide.

The hole saw guide guides the pilot drill of a hole saw assembly while the hole saw forms a new hole either concentric with or eccentric of an existing hole in a work piece. The hole saw guide includes a typically disc-shaped body having a pilot drill guide hole through the center, the hole sized to guide the pilot drill. Two or more guide arms are mounted to extend radially outwardly from the body. The guide arms have outer ends which typically engage the inner circumference of the existing hole in the work piece. The guide arms are adjustable in length so the pilot drill guide hole in the body can be positioned where desired, that is at the center of the new hole. The guide arms maintain the hole saw guide in position within the existing hole. The pilot drill of the conventional hole saw assembly is then inserted into the pilot drill guide hole which positions and guides the hole saw so that the new hole in the work piece is properly located.

A primary advantage of the invention is that it allows a new hole to be cut into a work piece using a hole saw which partially overlaps or surrounds an existing hole without requiring extraordinary clamping and guiding means as would otherwise be required. The hole saw guide is simple in construction, inexpensive to manufacture, easy to use and adaptable to many different sizes of holes.

Other features and advantages of the present invention will appear from the following description in which the preferred embodiments have been set forth in detail in conjunction with the accompanying drawing.

BRIEF DESCRIPTION OF THE DRAWING

FIG. 1 is an exploded isometric view showing one embodiment of a hole saw guide made according to the invention in relation to a hole saw assembly.

FIG. 2 is a plan view showing the guide of FIG. 1 mounted within an existing hole in a work piece and illustrating a proposed, eccentrically positioned new hole to be cut in the work piece in dashed lines.

FIG. 3 is an isometric view of a second embodiment of the guide of FIG. 1.

DETAILED DESCRIPTION OF THE PREFERRED EMBODIMENT

Referring now to FIG. 1, a hole saw guide 2 made according to the invention is shown along with a conventional hole saw assembly 4. Hole saw assembly 4 includes a cylindrical hole saw 6 having a circular lower cutting edge 8 and a threaded hole 10 in its top 12. A mandrel 14 has a threaded end 16 for attachment within hole 10. Mandrel 14 includes a pilot drill hole 18 which accepts and guides a pilot drill 20. A set screw 22 secures the pilot drill 20 within mandrel 14 so that when hole saw assembly 4 is assembled, the end 24 of pilot drill 20 extends below cutting edge 8.

Hole saw guide 2 includes a disc-shaped body 26 having a centrally located pilot drill guide hole 28 formed axially therethrough. Three guide arms 30 extend radially from the outer edge 32 of body 26. Guide arms 30 include a threaded shank 34 engaging a complementary threaded hole formed in body 26 and an outer circumferential hole surface engaging head 38. Knurled discs 39 are fixed to shanks 34 and are used to adjust the distance between heads 38 and pilot drill guide hole 28. Once hole saw guide 2 is properly positioned within an existing hole 40, shown in FIG. 2, in a work piece 42, guide arms 30 are positioned by grasping knurled disc 39 and rotating discs 39 until heads 38 contact the inner circumferential surface 44 of hole 40. The friction between shanks 34 and their complementary holes in body 26 keep guide 2 secured within existing hole 40. In some situations it may be desired to secure guide arms 30 in place in a more positive manner. This can be easily accomplished by providing a jam nut over threaded shank 34 which would be secured against outer edge 32 of body 26 when arm 30 is in place.

Hole saw guide 2 is positioned so that guide hole 28 is at the center of the new hole 46 to be formed in work piece 42. This positioning can be aided in a number of ways. For example, body 26 can have a number of centering lines 48 scribed thereon to enable one to visually center hole 28 according to new hole centerline markings 49 marked on work piece 42. Of course, for different size holes, different length guide arms 30 can be used. Also, arms 30 need not all be the same length. Although new hole 46 indicated in FIG. 2 is eccentric of the center of the existing hole 40, hole saw guide 2 can, of course, be used to form an enlarged new hole which is concentric with the existing hole. Also, new hole 46 need not completely encompass existing hole 40.

Turning now to FIG. 3, an alternative embodiment of the hole saw guide 2 of FIG. 1 is shown. Hole saw guide 50 includes a body 52 and a pair of outwardly extending L-shaped arms 54 mounted to the top surface 56 of body 52 by screws 58 and washer 60. Arms 54 each include an elongate leg 62 having open ended slot 64 formed substantially along its entire length and a relatively short leg 66 formed at a right angle to long leg 62. Screws 58 are used to secure legs 54 at their appropriate places within an existing hole 40. Slot 64 is wide enough so that long leg 62 may extend to or past guide hole 68 without interfering with the passage of pilot drill 20 through the guide hole.

In use, a hole saw guide, such as guide 2, is placed within existing hole 40 and positioned so that guide hole 28 is at the center of new hole 46. This alignment is aided by lines 48, 49 on body 26 and work piece 42 respectively. Guide 2 is secured into position by extending guide arms 30 until they securely engage the inner circumferential surface 44 of existing hole 40. Once tightly secured within hole 40, a hole saw assembly 4, with the appropriately sized hole saw 6, is centered over guide 2 so pilot drill 20 passes through guide hole 28. New hole 46 is then cut into work piece 42 as pilot drill 20 and hole saw 4 therewith is guided by guide 2.

Other modification and variation can be made to the disclosed embodiment without departing from the subject of the invention as defined in the following claims. For example, instead of using arms 30 or 54 to secure body 26 into the proper position by engaging surface 44 of hole 40, guide 2 may be configured to clamp onto workpiece 42 at one or more places surrounding hole 40.

I claim:

1. A hole saw guide, for use in combination with a hole saw of the type including a cylindrical hole saw and a pilot member, for guiding the hole saw when forming a new hole in a work piece having an existing hole formed in the work piece, the center of the new hole being within the existing hole, the guide comprising:
    a body member having a pilot member guide hole for guiding the pilot member; and
    means for mounting said body member within the existing hole with said pilot member guide hole concentric with the center of the new hole, the mounting means including:
        a plurality of adjustable length guide arm means for engaging the inner circumference of the existing hole; and
        means for securing said guide arm means to said body member at selected positions to said pilot member guide hole is positioned at the center of the new hole to be formed in the work piece.

2. The guide of claim 1 wherein said body member is disc-shaped.

3. The guide of claim 1 comprising two said guide arm means.

4. The guide of claim 1 wherein said guide arm means includes:
    an L-shaped member having a longer slotted leg and a shorter leg, said shorter leg at an angle to said longer leg; and
    said securing means includes a screw sized to pass through the slot in said slotted leg and into said body member to secure said L-shaped member to said body at a chosen position.

5. The guide of claim 1 wherein said guide arm means includes:
    a plurality of threaded placement members mounted in threaded holes in said body member and extending radially outwardly from said pilot member guide hole, said threaded members having outer head ends for engaging the inner circumference of the existing hole; and
    said securing means includes locking nuts, threadably mounted to said threaded placement members.

6. A guided hole saw assembly for forming a new hole in a work piece having an existing hole formed in the work piece, the center of the new hole being within the existing hole, the assembly comprising:
    a cylindrical hole saw having a circular cutting edge;
    a pilot member mounted concentric with and to the hole saw, said pilot member having a cutting end extending past said circular cutting edge;
    a body member having a pilot member guide hole for guiding the pilot member;
    a plurality of adjustable length guide arm means for engaging the inner circumference of the existing hole; and
    means for securing said guide arm means to said body at selected positions so said pilot member guide hole is positioned at the center of the new hole to be formed in the work piece.

7. The assembly of claim 6 wherein said pilot member is a pilot drill.

* * * * *